Dec. 24, 1957 — L. C. MORRIS — 2,817,175
LANDING NET
Filed April 6, 1956 — 2 Sheets-Sheet 1

INVENTOR.
Laythn C. Morris
BY
ATTORNEY

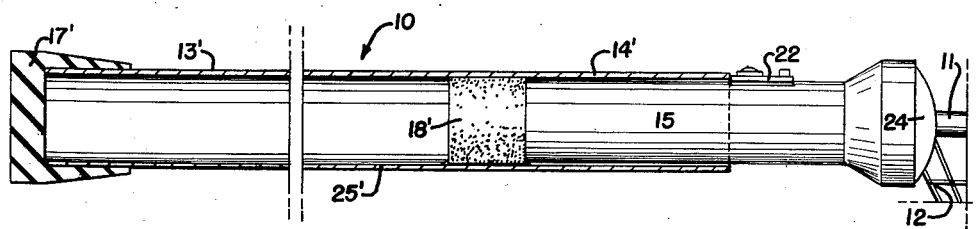
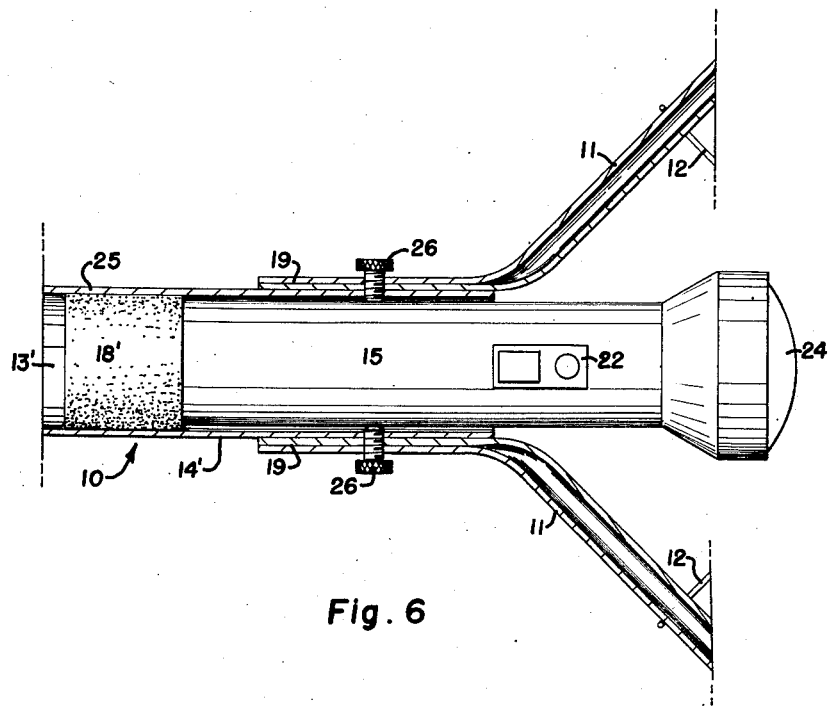

United States Patent Office 2,817,175
Patented Dec. 24, 1957

2,817,175

LANDING NET

Laythn C. Morris, near Arvada, Colo.

Application April 6, 1956, Serial No. 576,726

10 Claims. (Cl. 43—11)

This invention relates to hand nets of the general type utilized by fishermen to remove from the water fish hooked on light tackle, and has as an object to provide a novel and improved construction and organization of elements constituting such a facility.

A further object of the invention is to provide a novel and improved landing net for fishermen that is characterized by an inherent buoyancy sufficient to float the unit at the surface of water wherein it may be inadvertently released.

A further object of the invention is to provide a novel and improved combination of a floatable landing net and selectively-actuable light-emitting means operable to illuminate the working area of the net.

A further object of the invention is to provide a novel and improved landing net adapted for advantageous, interchangeable, operative coaction with a conventional flashlight unit assembly.

A further object of the invention is to provide a novel and improved landing net that is light of weight in a sturdy, durable construction.

A further object of the invention is to provide a novel and improved landing net susceptible of economical production in any expedient range of sizes from known and available materials.

With the foregoing and other objects in view, my invention consists in the construction, arrangement, and operative combination of elements as hereinafter set forth, pointed out in my claims, and illustrated by the accompanying drawings, in which—

Figure 5 is a fragmentary, detail section similar to Figure 3 taken axially through the handle portion of a modified net construction within the contemplation of the invention, a length portion of the view being broken away to conserve space.

Figure 6 is a fragmentary, detail section, on a relatively enlarged scale, of the handle and loop junction portion of the construction according to Figure 5 as viewed perpendicular to the plane of said latter view.

Landing nets for single hand manipulation by fishermen have long been utilized in a conventional organization characterized by a straight, rigid, relatively short handle, a loop fixed to and extending axial of the handle from one end thereof, and a mesh pouch, or trap, attached to and held open by said loop to depend loosely therefrom when the loop is substantially horizontal. The utility of hitherto conventional landing nets as been somewhat restricted by excessive weight of the constructions, a lack of buoyancy that results in sinking of a conventional net dropped or released in the water, and the difficulty of effective net manipulation by a single operator in the dark, hence the instant invention is directed to the production of a landing net construction and organization retentive of the known utility and advantages of conventional such facilities and corrective of the deficiencies thereof above mentioned.

Figure 1:
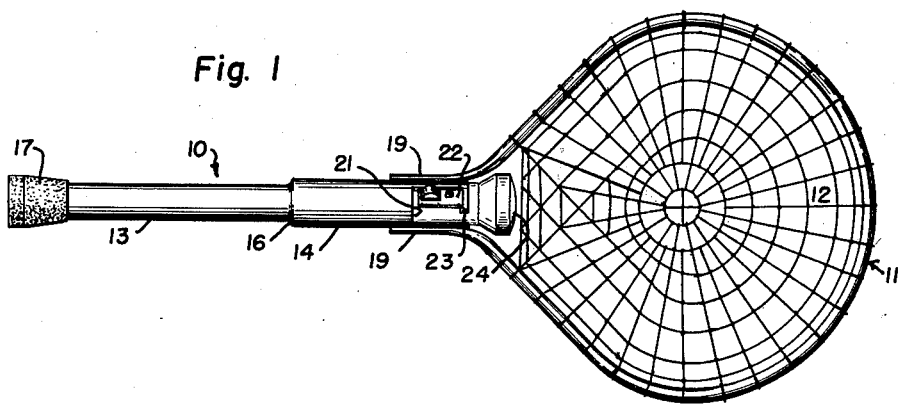
Figure 1 is a plan view of a typical embodiment of the invention as constructed and arranged ready for practical use.
Figure 2:
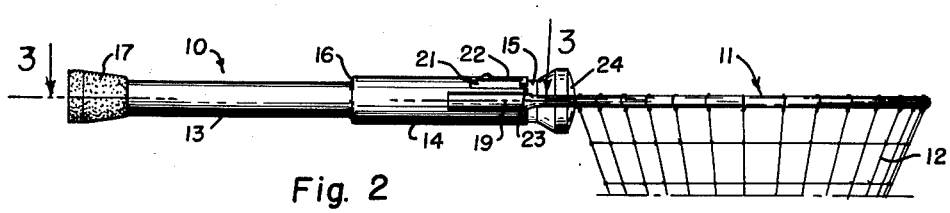
Figure 2 is a side elevation of the organization according to Figure 1, a terminal portion of the usual mesh member being omitted to conserve space.
Figure 3:
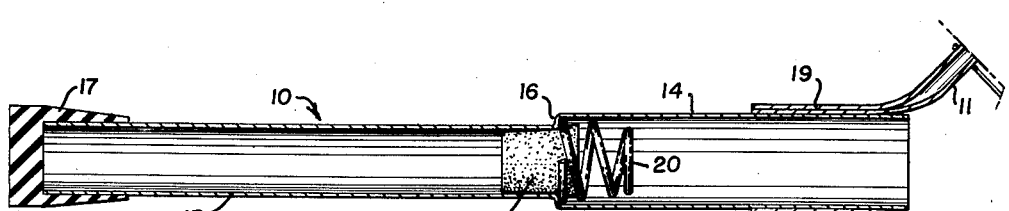
Figure 3 is a fragmentary, detail section, on a relatively enlarged scale, axially through the handle portion of the improvement according to the preceding views and taken substantially on the indicated line 3—3 of Figure 2 with the flashlight unit of said latter view omitted.
Figure 4:
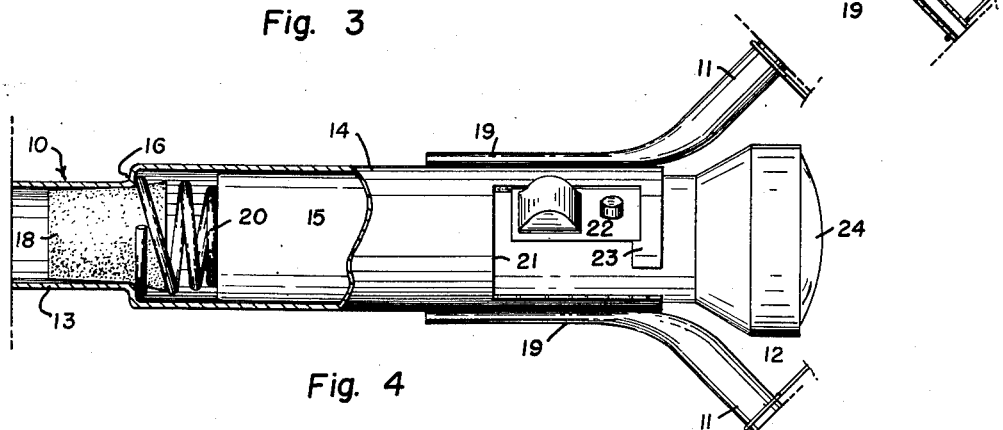
Figure 4 is a fragmentary, detail elevation, on a further enlarged scale and with portions broken away to show otherwise concealed relationships, of the flashlight unit mounting at the junction of the handle and loop members shown in Figures 1 and 2.

Structurally and operatively simulative of conventional landing nets, the improvement of the invention as shown in Figures 1–4, inclusive, is characterized by a straight, rigid, handle portion 10 fixedly engaged at one end with a closed loop 11 disposed to outstand axially from and beyond the handle, and a loosely-pouched, net trap, or member, 12 attached at its mouth to and for expansion by said loop, that which distinguishes the invention being the unique, light weight, floatable construction of the handle and loop and the provision for interchangeable, operative association of a flashlight unit with the handle in position to illuminate the loop 11, mesh trap 12, and immediately adjacent areas under convenient, selective manipulation by a user of the assembly.

The handle portion 10 of the improvement is formed of rigid, light weight, tubular material, such as aluminum or magnesium metal, plastic, or the like, to provide a right cylindrical, open-ended grip 13 dimensioned as to diameter and length for firm grasp and convenient manipulation by but one hand of a user and an integrally or fixedly associated right cylindrical socket 14, also open at both ends, coaxially extending the grip 13. The socket 14 is dimensioned to telescopically accommodate a conventional, two-cell, flashlight unit 15 with the lens end thereof exterior to the socket, thus expediently determining for the socket a diameter somewhat greater than that of the grip 13 to which the socket connects through an annular shoulder 16 productive of a circular ledge interiorly of the handle portion. While it is entirely feasible to separately form the grip 13 and socket 14 for subsequent interconnection, it is equally feasible to form said elements as an integral assembly, as illustrated, and both such constructions are within the contemplation of the invention.

The end of the grip 13 remote from the socket 14 is capped, plugged, or otherwise sealed to inhibit entrance of water to or escape of air from the grip interior, the provision of an exterior cap 17 of buoyant, light weight material telescoped over and sealed to the end of the grip serving to increase the displacement and enhance the buoyancy of the grip while advantageously functioning as a stop to limit sliding of the grip through the hand of the user. At its junction with the socket 14, the grip 13 is interiorly plugged, or otherwise closed, as by means of a cork 18, or the equivalent, securely seated within the grip bore, whereby to constitute said grip 13 as a closed, air-filled chamber of little weight and substantial buoyancy.

The loop 11 is formed to appropriate size and desired shape from a suitable length of rigid, light weight, tubular material, such as aluminum or magnesium metal, plastic, or the like, conveniently the same as that utilized for production of the handle portion 10, and the ends 19 of such tubular length are flattened to close the tube interior away from escape of air and exposure to intrusion of extraneous matter, are directed away from the loop in a spaced parallelism with and on opposite sides of a diameter bisecting the loop such as to embrace the socket 14 therebetween, and are transversely arcuately conformed to engagement of their opposed inner faces against the socket exterior. The loop ends 19 are disposed to overlie opposite sides of the socket 14 longitudinally, inwardly, and adjacent the open outer end thereof, whereby to mount the loop 11 as an extension axially of and outwardly from the socket end of the handle portion 10 in symmetrical relation with and in a plane containing the axis of said handle portion, in which relation said ends 19 are firmly secured to the socket walls thereby engaged, as by means of welding, brazing, riveting, or otherwise, to establish a fixed, unitary assembly of said handle portion and loop. The mesh pouch, or trap, 12 is of any appropriate conventional construction, size, and shape and is conventionally attached at its mouth to the loop in any expedient manner, whereby to complete the assembly of the handle portion, loop, and pouch or trap as a landing net unit characterized by light weight and floatability adapted for practical use in the customary manner.

With the socket 14 sized to telescopically receive and slidably accommodate the body of a conventional flashlight unit 15, as above set forth, the improvement is conditioned to give full effect to the principles of the invention through the provision of a relatively short, expansive coil spring 20 fitted interiorly of the socket 14 to bear at one end against the annular interior ledge of the shoulder 15 with its other end directed toward the open end of the socket for engagement by the inserted end of the flashlight unit 15 in an arrangement effective to yieldably urge said unit outwardly of the socket, and through the provision of a bayonet-type joint notch 21 opening through the end of the socket 14 remote from the spring 20 for slidable and rotatable accommodation of and latching coaction with the switch boss 22 conventionally characterizing the unit 15. The notch 21 is formed with a slideway accommodative of the width of the boss 22, which opens through the free end of the socket 14 and inwardly and longitudinally of the socket a distance greater than the length of said boss, the notch is extended from said slideway circumferentially of the socket in a width of opening accommodative of the boss length and to a distance greater than the boss width, whereby to provide a lip 23 at the end of the socket whereunder the boss 22 may be revolubly engaged, and said lip is formed with a shallow notch opening away from the free end of the socket wherein the adjacent end of the boss may be seated by the pressure of the spring 20 to detachably latch the unit 15 within the socket 14 with the switch elements carried by the boss 22 in position of convenient access for manipulation by a finger of the hand grasping the handle portion 10 and with the lens end 24 of the unit 15 directed toward and for selective illumination of the loop and trap areas. Thus the unit 15 is securely held and positioned for use in the socket 14 of the handle portion 10 by an arrangement that facilitates removal, replacement, and interchange of said unit through simple and obvious manual operations.

By virtue of the light-weight, tubular construction of the handle portion 10 and loop 11 and the sealing of said members for entrapment of air therewithin, an inherent buoyancy is developed in the landing net assembly to a degree sufficient to float the same despite the weight of the associated flashlight unit 15.

The modified construction represented by Figures 5 and 6 is functionally and operatively identical with that hereinabove described and differs from the latter only in certain details of structure promotive of some facility and economy of production. In the modification, working of the handle 10 to provide the grip 13 and socket 14 portions of different diameters and the bayonet-type joint notch 21 is eliminated through the use of said handle of a straight, uniform-diameter length 25 of tubular material having a bore size accommodative of the flashlight unit 15. One end of the member 25 is closed and sealed, as by means of a cap 17' equivalent to the cap 17, and the bore of said member is plugged by means of a cork, or wad, 18' secured or frictionally held within the bore in any expedient manner at a distance inwardly from the member open end adequate to accommodate the length of the flashlight unit 15 between the switch boss 22 and the base of the unit remote from its lens end 24, thus to define a buoyant chamber and grip portion 13' from the member length cooperating with and between the cap 17' and plug 18' and a socket portion 14', of less axial depth than the socket 14, extending beyond said plug. The flattened ends 19 of the loop 11 are engaged with and affixed to opposite sides of the socket 14' to associate said loop with the handle member 25 in the manner hereinbefore described, and clamp studs 26 threadedly engage through said loop ends and the underlying walls of the socket 14' in opposition diametrically of the socket to adjustably intrude within the latter for clamping engagement with the body of a unit 15 seated therewithin. There being in the socket 14' of the modified construction no notch for the reception of the switch boss 22 of the unit 15, said unit slidably engages within the socket a distance determined by engagement of said boss against the open end of the member 25, in which mounting said unit is interchangeably secured by means of the clamp studs 26 in an extension of its lens end 24 outwardly from the open end of the socket 14' and well within the area enclosed by the loop 11 for use as above set forth.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A landing net comprising a tubular handle formed at one end as a socket opening axially thereof, a plug terminating said socket interiorly of the handle and obstructing the latter, a closure at the end of the handle remote from said socket coacting with said plug to define a buoyant chamber in the handle portion therebetween, a rigid loop affixed to said socket in projection outwardly beyond the open end thereof, a mesh pouch carried by said loop, and a flashlight unit interchangeably seated in said socket for direction of a light beam centrally across said loop.

2. A landing net comprising a tubular handle formed as a grip portion and a radially-enlarged coaxial socket opening axially thereof, closures at the opposite ends of said grip portion defining a buoyant chamber therein, a rigid loop affixed to said socket in projection outwardly beyond the open end thereof, a mesh pouch carried by said loop, and a flashlight unit interchangeably seated in said socket for direction of a light beam centrally across said loop.

3. A landing net comprising a tubular handle formed as a grip portion and a radially-enlarged coaxial socket opening axially thereof, closures at the opposite ends of said grip portion defining a buoyant chamber therein, a rigid loop of tubular material closed at its ends to define a buoyant chamber interiorly thereof affixed at said closed ends to said socket in projection outwardly beyond the open end of the latter, a mesh pouch carried by said loop, and a flashlight unit interchangeably seated in said socket for direction of a light beam centrally across said loop.

4. A landing net comprising a tubular handle formed as a grip portion closed at its ends to define a buoyant chamber therein and a radially-enlarged coaxial socket opening axially thereof, a rigid loop of tubular material closed at its ends to define a buoyant chamber interiorly thereof affixed at said closed ends to said socket in projection beyond the open end of the latter, a mesh pouch carried by said loop, a flashlight unit telescopically accommodated in said socket for direction of a light beam centrally across said loop, and means detachably securing said unit in said socket.

5. The organization according to claim 4, wherein the means closing the ends of the grip portion are a cap of buoyant material telescoped over and sealed to the end of the grip portion remote from the socket and a plug of buoyant material telescopically filling and sealing the bore of said grip portion at the junction of the latter with the socket.

6. The organization according to claim 4, wherein the ends of the tubular material forming the loop are flattened to close the buoyant chamber characterizing the loop, and said flattened ends exteriorly engage and are affixed to diametrically opposite areas of the socket in longitudinal alignment therewith and inwardly adjacent the open end thereof.

7. The organization according to claim 4, wherein the flashlight unit is characterized by a conventional switch boss outstanding radially from the cylindrical body thereof, and the means detachably securing said unit in the socket comprise a socket open-end portion formed with a bayonet-type joint notch slidably and rotatably accommodative of said boss adjacent and opening through the open end of the socket, and an expansive spring at the base of the socket adapted to yieldably urge said unit outwardly of the socket and into latching coaction of said boss and notch.

8. In a landing net having a handle, a rigid loop affixed to one end of said handle in projection axially and outwardly therefrom, and a mesh pouch carried by said loop, the improvements which comprise a buoyant chamber in said handle, a buoyant chamber interiorly of said loop, a socket accommodative of a conventional flashlight unit adjacent and opening at one end through the junction of said loop handle, and means including an expansive spring and a socket open-end portion formed with a bayonet-type joint notch intersecting the open end margin of said socket for interchangeably retaining a flashlight unit therein.

9. A landing net comprising a tubular handle closed at one end, a plug interiorly obstructing said handle inwardly of its other end to define a buoyant chamber and a coaxial socket opening axially thereof, a rigid loop of tubular material closed at its ends to define a buoyant chamber interiorly thereof affixed at said closed ends to said socket in projection beyond the open end of the latter, a mesh pouch carried by said loop, a flashlight unit telescopically accommodated in said socket for direction of a light beam centrally across said loop, and means detachably securing said unit in said socket.

10. The organization according to claim 9, wherein the ends of the tubular material forming the loop are flattened to close the buoyant chamber characterizing the loop, said flattened ends exteriorly engage and are affixed to diametrically opposite areas of the socket in longitudinal alignment therewith and inwardly adjacent the open end thereof, and the means detachably securing said unit in the socket comprise clamp studs threadedly engaged through said flattened ends of the loop and subjacent socket walls to intrude radially of the socket.

References Cited in the file of this patent
UNITED STATES PATENTS

| | | |
|---|---|---|
| 752,550 | Hertitage | Feb. 16, 1904 |
| 2,066,439 | Wine et al. | Jan. 5, 1937 |
| 2,420,087 | Meek | May 6, 1947 |